July 26, 1932.  T. V. GOODRICH  1,868,823
EDUCATIONAL MATERIAL
Filed Jan. 25, 1930
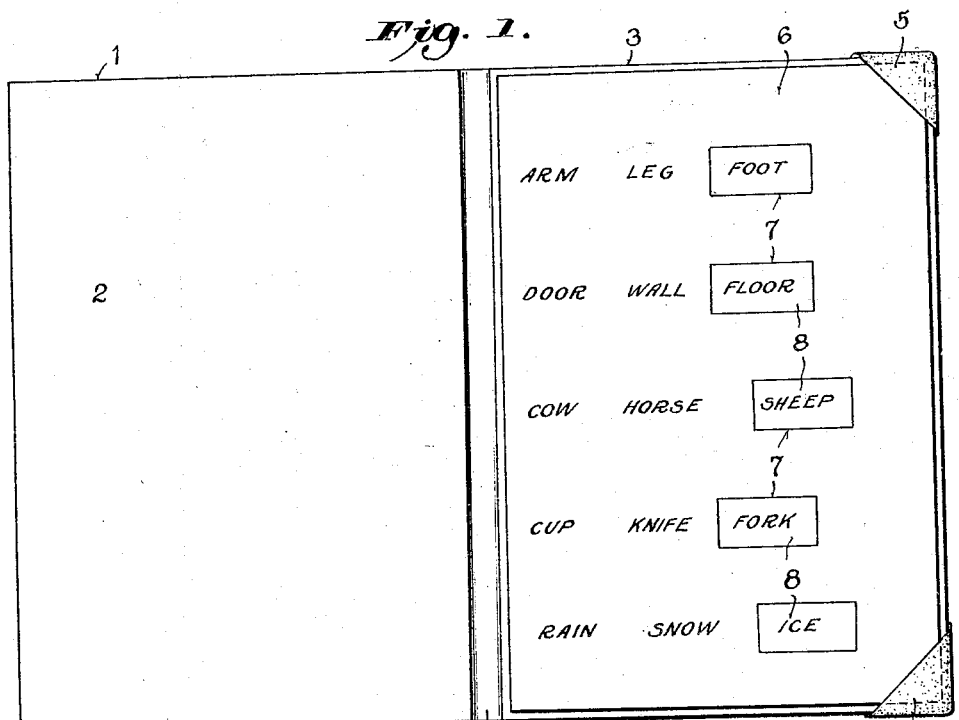
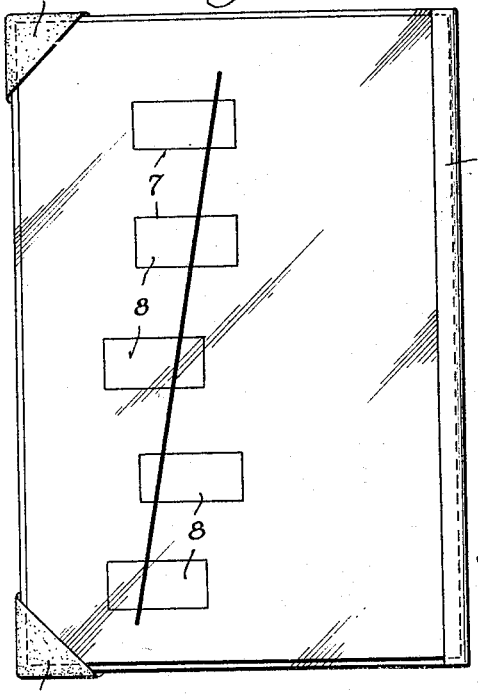
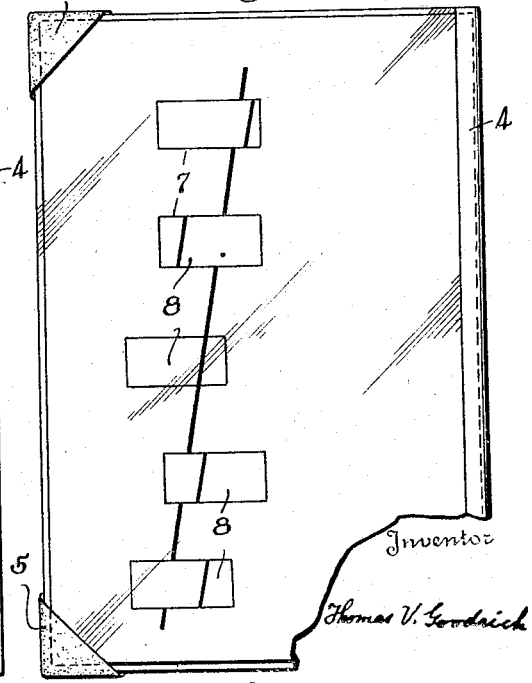

Patented July 26, 1932

1,868,823

UNITED STATES PATENT OFFICE

THOMAS V. GOODRICH, OF LINCOLN, NEBRASKA

EDUCATIONAL MATERIAL

Application filed January 25, 1930. Serial No. 423,399.

My invention relates to educational material. It has for its object the production of apparatus for constructing and operating reading exercises or tests or other instructional material whereby pupil responses to these exercises may be indicated in such a manner that they are self corrective; that is that the correctness of the responses may be automatically indicated without the necessity of reading them or of comparing them with a scoring key.

The essential features of my apparatus are as follows: For each exercise there are:

*a.* A "stimulus" card containing words, sentences, paragraphs, drawings, pictures, or other materials

*b.* Response cards containing words, sentences, paragraphs, drawings, pictures, or other materials

*c.* Questions to be answered, or directions to be followed by placing the response cards in certain positions with reference to the stimulus card

*d.* Lines on the back of the stimulus and response cards in such relative positions that when the questions are correctly answered or the directions carried out, a single complete line, on the backs of the response cards and the stimulus card; and that when the response cards are incorrectly placed with reference to the stimulus card, the line on the backs of the response cards and the stimulus card is incomplete, broken or distorted.

The stimulus and response cards are preferably, but not necessarily, used in connection with a folder having a transparent back, into which the stimulus and response cards may be placed and which when closed will hold the response cards securely in a desired position with reference to the stimulus card.

Material which I employ for practicing my invention is illustrated in the accompanying drawing, wherein Fig. 1 is a face view of the stimulus card held in a folder with a transparent leaf or covering for the back of the card. Fig. 2 is a back view of the folder and the stimulus card with the response cards inserted in their correct places, both being visible through the transparent leaf of the folder. Fig. 3 is a back view showing the cards correctly inserted in individual openings.

Referring to the drawing,

In Fig. 1, 1 designates a folder, having two leaves, the leaf 2 being opaque and the leaf 3 being of transparent material, the two being hinged together as for example by a strip of cloth 4. The transparent leaf 3 is provided with corner pockets 5 made of suitable material in such manner that the stimulus card 6 may be inserted as shown in Fig. 1 so as to come between the two leaves 2 and 3 when closed together, with its corners held in the pockets 5 and when the two leaves 2 and 3 are open having its face exposed to the observation and manipulation of the child. Figs. 2 and 3 show the appearance of the back of this stimulus card when so inserted.

The stimulus card, which contains the material to which the mind of the child must react, is designated by the numeral 6, and in it I produce openings 7 to receive the response cards 8. In the particular instance selected for illustration, there are openings to receive 5 response cards. The responses of the pupil consist in putting in proper relationship "words that belong together", such as parts of the body, food products, members of the family, parts of the house, etc. In making the test the child is furnished the folder with the stimulus card therein, and all of the response cards also inclosed loosely within the folder or assembled in some other suitable manner. The child then places the response cards in what he determines to be their proper positions, closes the folder and turns it over. Since a single straight line is used for control, and if all the cards are correctly placed, the line will be a continuous straight line as shown in Figure 2. If on the contrary, some of the cards are misplaced, the line will be broken as shown in Fig. 3. In case errors appear and it be desired to have the child correct his own work, he may be directed to re-study the material appearing on the face of the card and at a later time to again attempt to make the correct response, or he may be instructed to observe this broken line and then replace the cards so as to produce a straight line, afterward turning over the folder and observing the correct positioning of the responses.

It may be possible to hold the response cards in position either with or without the use of a folder, but for purposes of description I prefer to present it with a folder. If such be used, it may have a transparent back or the back may be cut so as to preserve the design and still hold the cards in position. Other means for holding the cards may be provided which do not involve openings in the holder itself.

I am aware of Letters Patent No. 1,701,557 granted Feb. 12, 1929, to D. Clinch et al. but it will be apparent from the foregoing description that I accomplish certain ends with my apparatus which are impossible with the Clinch device. The latter is a game, while my apparatus is strictly educational. With it the teacher or examiner may secure both qualitative and quantitative information regarding several very important facts in child development, (1) the mental alertness of the child; (2) his knowledge of the subject matter of instructions; (3) his mastery of fundamental skills as, reading, or numbers; (4) his powers of coordination; (5) if the child corrects his own exercises, the degree of adaptability and power of assimilation of new ideas or correction of old ones. Further by my invention the correctness of the child's responses is indicated automatically by the placement of the response cards while by the Clinch device comparison is necessary between the figure built up by the child and a detached figure which serves as a model or key. I am also aware of Letters Patent No. 1,539,397 granted May 26, 1925 to C. H. Matravers. This involves a species of mechanical subtraction for convenient scanning of grammatical forms and does not involve any code indication either for self correction by the child or correction by the teacher, or any means for testing or measuring as hereinbefore set forth.

As examples of the material which can be advantageously employed on my stimulus card for testing different faculties and different lines of development, I may mention the following:

Title; "Who said it?" Statement; 1. "I give milk for boys and girls to drink." Response card with picture of cow. 2. "I give wool to make your clothes." Response card with the picture of a sheep and so on with pictures of various other animals.

Title; "When would you see it?" 1. Spring: (a) Farmers planting corn. (b) Buds on the lilac bushes. (c) Lawns turning green, etc. 2. Summer: (a) The last day of school. (b) A Fourth of July picnic. (c) Boys swimming in the lake, etc. 3. Fall: (a) People going to the fair. (b) A big crowd at the football game. (c) Leaves falling from the trees, etc. 4. Winter: (a) The shortest day in the year. (b) Snow on the ground. (c) A hot fire in the furnace, etc.

Title; "What do these fables teach?" 1. The Lion and the Mouse. Query, "This fable teaches?" Response card "That it is always worthwhile to make friends." 2. The Mice in Council. Query, "This fable teaches?" Response card "That it is easy to make plans but not so easy to make plans that can be used", etc.

Title; "How do you measure it?" 1. How far is it to Omaha? Response card "65 miles". 2. How much does John weigh? Response card "65 pounds". 3. How tall is Frank? Response card "5 feet", etc.

It will be apparent from the foregoing that my invention is not limited to a particular set of words or symbols nor even to a particular form or use but that the apparatus may be varied as to many details without departing from the invention. I wish it distinctly understood therefore that I am not confined to the specific form described but contemplate all variations thereof which fall fairly within the scope of the appended claims.

For example, while I have used the word card in the specification and claims to indicate the small removable units 8, the word card might be inappropriate if the substance be changed, so that a suitable block of wood or any other material would be quite as appropriate as a card. Similarly the stimulus card 6 would often carry directions, specific or implied, rather than questions. Such non-essential changes are contemplated by me and intended to be within the scope of the appended claims.

What I claim is:

1. In a device of the character described, a stimulus card having a number of items printed thereon with an opening in said card adjacent to each item, said openings being of uniform size and shape, and on the reverse side of the card lines each crossing a respective intervening portion of the card between said openings, loose response cards of uniform size and shape so cut as to fit individually and interchangeably into said openings in the stimulus card, each response card having two faces, and bearing on one face an item related in a predetermined manner to a corresponding item on the stimulus card, and bearing on the other face a line, so drawn that when the response cards are placed in the correct position with reference to the stimulus card, the separate lines on the backs of the response cards will unite with the lines on the back of the stimulus card to form a single continuous line.

2. The device described in claim 1, in combination with a folder having one opaque leaf and one transparent leaf constructed of a single sheet of transparent material with suitable card holding means, such as corner pockets, adapted to hold the back of the stimulus card in a contactual relation with the transparent leaf, and to permit the placement of the response cards in the open spaces of the stimulus card while the stimulus card is held in contactual relation with the transparent leaf, whereby when the folder is closed the response cards will be held as placed, the folder may be reversed and the lines on the back of the card will be visible through the transparent leaf.

3. The device described in claim 1, in combination with a folder one leaf of which is provided with means for holding the stimulus card, and with an opening or openings through which the lines on the back of the response cards are visible when the response cards are in position and the folder reversed.

4. In a device of the character described, a single card carrying a plurality of items calling for responses, separate openings uniform in size and shape opposite the respective items, and separate cards bearing responses individually related to the several items, said cards being also of uniform size and shape to fit any of said uniform openings, and a line on the back of each response card together with lines on the portions of the back of the single card between said openings, one on each, which become automatically united by the lines on the backs of the response cards when and only when the response cards are in correct positions with respect to the units to which they are related.

In testimony whereof I hereunto affix my signature.

THOMAS V. GOODRICH.